(12) United States Patent
Wang et al.

(10) Patent No.: US 6,326,433 B1
(45) Date of Patent: *Dec. 4, 2001

(54) ISOBUTYLENE BASED ELASTOMER BLENDS HAVING IMPROVED STRENGTH ELASTICITY, AND REDUCED PERMEABILITY

(75) Inventors: Hsien-Chang Wang, Bellaire; Ilan Duvdevani, Houston; Sudhin Datta, Houston; Connie R. Qian, Houston, all of TX (US)

(73) Assignee: ExxonMobil Chemical Patents Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/569,363

(22) Filed: May 11, 2000

Related U.S. Application Data

(60) Provisional application No. 60/134,835, filed on May 19, 1999.

(51) Int. Cl.$^7$ .............................. C08L 23/10; C08L 23/26; C08L 23/28
(52) U.S. Cl. .......................... 525/191; 525/232; 525/235; 525/240; 525/241
(58) Field of Search ................................. 525/191, 232, 525/235, 240, 241

(56) References Cited

U.S. PATENT DOCUMENTS

| | | |
|---|---|---|
| 2,631,984 | 3/1953 | Crawford et al. . |
| 2,964,489 | 12/1960 | Baldwin et al. . |
| 3,099,644 | 7/1963 | Parker et al. . |
| 3,639,308 | 2/1972 | Topcik . |
| 4,256,857 | 3/1981 | Buckler et al. . |
| 4,443,279 | 4/1984 | Sandstrom . |
| 4,467,060 | 8/1984 | Lee . |
| 4,769,283 * | 9/1988 | Sipien et al. .......................... 428/343 |
| 4,786,697 | 11/1988 | Cozewith et al. . |
| 5,021,509 | 6/1991 | Keller et al. . |
| 5,071,913 | 12/1991 | Powers et al. . |
| 5,162,409 | 11/1992 | Mroczkowski . |
| 5,162,445 | 11/1992 | Powers et al. . |
| 5,292,845 | 3/1994 | Kawasaki et al. . |
| 5,333,662 | 8/1994 | Costemalle et al. . |
| 5,426,167 | 6/1995 | Powers et al. . |
| 5,430,118 | 7/1995 | Powers et al. . |
| 5,473,017 | 12/1995 | Wang . |
| 5,548,023 | 8/1996 | Powers et al. . |
| 5,548,029 | 8/1996 | Powers et al. . |
| 5,621,044 | 4/1997 | Wang . |
| 5,621,045 | 4/1997 | Patel et al. . |
| 5,654,379 | 8/1997 | Powers et al. . |
| 5,700,871 | 12/1997 | Arjunan et al. . |
| 5,705,549 | 1/1998 | Hojo . |
| 5,763,556 | 6/1998 | Shaffer et al. . |
| 5,866,665 | 2/1999 | Shaffer et al. . |
| 6,100,334 * | 8/2000 | Abdou-Sabet ........................ 525/191 |

FOREIGN PATENT DOCUMENTS

| | | |
|---|---|---|
| 826933 | 11/1969 | (CA) . |
| 1033877 | 6/1978 | (CA) . |
| 2217281 | 7/1998 | (CA) . |
| 0 142 047 A2 | 5/1985 | (EP) . |
| 0 263 718 A2 | 4/1988 | (EP) . |
| 0 376 558 A1 | 4/1990 | (EP) . |
| 0 744 440 B1 | 11/1996 | (EP) . |
| 0 872 516 A1 | 10/1998 | (EP) . |
| WO 94/06858 | 3/1994 | (WO) . |
| WO 94/22680 | 10/1994 | (WO) . |
| WO 98/46676 | 10/1998 | (WO) . |

OTHER PUBLICATIONS

The Post Vulcanization Stabilization for NR, W.F. Helt, B.H. To & W.W. Paris, *Rubber World,* Aug. 1991, pp. 18–23.

Formulation Design and Curing Characteristics of NBR Mixes for Seals, *Rubber World,* Sep. 1993, pp. 25–30.

"A Study on the Heat of Fusion of B–Polypropylene", J.X. L$^{1a}$, W.L. Cheung$^{a,*}$, Demin Jia$^b$, *Polymer,* 40 (1999) 1219–1222.

"First Polymer Component (SPC)" U.S. Application filed May 13, 1999, Attorney reference No.: 99B007, USSN 60/133,966.

W.F. Helt, B.H. To and W.W. Paris, "Post Vulcanization Stabilization for NR", *Rubber World,* Aug., 1991, v.204 (5)—pp. 18–24.

A. S. Farid—"Formulation Design and Curing Characteristics of NBR Mixes for Seals", *Rubber World,* Sep. 1993, v. 208(6)—pp. 25–30.

JP 07164810 A, Jun. 27, 1995 (Derwent Abstract 95–260690).

JP 05295192 A, Nov. 9, 1993 (Derwent Abstract 93–392824).

JP 04050587 A, Feb. 19, 1992 (Derwent Abstract 92–1179292).

JP 05014152 B, Feb. 24, 1993 (Derwent Abstract 93–098026).

JP 06206283 A, Jul. 26, 1994 (Derwent Abstract 94–275706).

(List continued on next page.)

*Primary Examiner*—Nathan M. Nutter
(74) *Attorney, Agent, or Firm*—Joseph F. Reidy; Kevin M. Faulkner; Brent M. Peebles

(57) ABSTRACT

The improved green strength, green elongation, and green relaxation properties of isobutylene based elastomers at elevated temperatures along with improved aging and barrier properties are achieved by blending semi-compatible, semi-crystalline polymers with the isobutylene elastomers. The improved properties are maintained in subsequent rubber compounds containing said blends and are particularly useful in tire and pharmaceutical container applications.

38 Claims, No Drawings

OTHER PUBLICATIONS

JP 01104641 A, Apr. 21, 1989 (Derwent Abstract 89–161895).

JP 61103953 A, May 22, 1986 (Derwent Abstract 86–172245).

EP 120833 A, Oct. 03, 1984 (Derwent Abstract 84–245318).

DD 81474 A, Priority Application Information Mar. 20, 1970, (Derwent Abstract 71–46617S).

JP 083379694 A, Dec. 24, 1996 (Derwent Abstract 97–103757/10).

* cited by examiner

ISOBUTYLENE BASED ELASTOMER BLENDS HAVING IMPROVED STRENGTH ELASTICITY, AND REDUCED PERMEABILITY This is a Regular Application of Provisional Application No. 60/134,835 filed May 19, 1999.

FIELD OF INVENTION

This invention relates to isobutylene based polymers (IBP), particularly halogenated isobutylene based polymers, and more particularly to brominated butyl rubber of improved green strength and improved impermeability and methods for its preparation.

BACKGROUND OF THE INVENTION

Isobutylene based polymers have been blended with numerous compositions such as natural rubber in order to increase its various properties, such as elasticity, strength, air impermeability, etc. Natural rubber (NR) is known to crystallize upon extension and is known to have very high molecular weight fractions, both of which help in its green properties. Such properties are important in fabricating rubber articles from green compounds, particularly composites such as tires, but can be important in extruded items such as innertubes and molded articles such as pharmaceutical stoppers. Isobutylene based polymers are therefore blended with natural rubber when green properties need to be improved. However, green strength properties of isobutylene based polymers are defensive to those of natural rubber, particularly at elevated temperatures up to about 50° C. Addition of natural rubber reduces the barrier properties of IBP/NR blends significantly which is undesirable for applications requiring low permeability to gases, such as in tires and in bladder applications. Heat stability of cured compounds is also diminished in natural rubber blends.

Isobutylene based polymers, particularly halogenated isobutylene based polymers, and more particularly brominated butyl rubber are the primary compositions of most tire liners, heat resistant tubes, bladders and other commercially known products such as pharmaceutical ware. The term "butyl rubber" as employed herein is intended to refer to a vulcanizable rubbery copolymer containing, by weight, from about 85% to about 99.5% combined isoolefin having from 4 to 8 carbon atoms. Such copolymers and their preparation are well known. Halogenated butyl rubber, particularly brominated butyl rubber, is also well known. It may be prepared by treating a solution of butyl rubber, in an organic solvent, with bromine and recovering the brominated butyl rubber by contacting it with steam and drying the resulting aqueous slurry.

Brominated butyl rubber typically contains less than one bromine atom per carbon-carbon double bond originally present in the polymer or from about less than 3-wt. percent bromine. The Mooney viscosity of the halobutyl rubbers useful in the instant invention are measured at 125° C. (ML 1+8) range from about 20 to about 80, more preferably from about 25 to about 55, and most preferably from about 30 to about 50. It is a relatively chemically resistant, rubbery polymer which can be compounded and cured to produce synthetic rubber with an outstanding air impermeability, useful in making tire innerliners and innertubes.

Brominated butyl rubber has a greater degree of reactivity than butyl rubber, so that it can be blended with other unsaturated polymers and co-vulcanized therewith, which the unreactivity of butyl precludes. Brominated butyl rubber vulcanizates, however, show good air impermeability, heat aging characteristics and general chemical resistance. It finds one of its principal uses in the tubeless tire innerliners. Such liners are in effect thin sheets of rubber, adhered to the tire carcass by co-vulcanization with the rubbers comprising the tire carcass. The heat aging characteristics air impermeability and co-vulcanizability of brominated butyl rubber render it suitable for use in such tire innerliners. Other known uses for halogenated butyl rubber include white sidewall compounds for tires, heat resistant tubes and bladders.

A deficiency of butyl and halobutyl rubber is its lack of green strength. Green strength is a term applied to denote the strength, cohesiveness and dimensional stability of rubber compounds before they are vulcanized or cured. In addition, the present application includes the elongation characteristics of the uncured compounds as a valuation of green strength. Lack of green strength renders difficult the processing and molding of rubber compounds based on butyl rubber. For example, in the manufacture of tire liners, very thin sheets of butyl rubber compound have to be prepared, applied to the green tire carcass and then cured. If the butyl or halobutyl rubber compound is deficient in green strength, there is risk of rupturing the thin sheets unless very careful handling thereof is undertaken.

The prior art has addressed some of the aforementioned deficiencies. U.S. Pat. No. 4,256,857 discloses the improvement of green strength by treating the brominated butyl rubber with relatively small amounts of certain organic amine compounds. Examples of suitable amine compounds include N,N-dimethyl hexylamine, N,N-dimethyldodecylamine, N,N-dimethyloctadecylamine, N,N-diethyldecylamine and N,N-dimethylbenzylamine. These amine compounds have been found to provide green strength and allow the retention of good processing properties. While other amine compounds may be reacted with brominated butyl rubber to improve the strength of the rubber compound they generally also cause the rubber compound to be of inferior processing properties, which is believed to be due to the formation of permanent crosslinks. However, such a process requires extreme heating and time requirements that are not efficient or practical for quick application for compounding in industrial applications.

U.S. Pat. No. 5,162,409 to Morocskowski describes a rubber composition suitable for use in automobile tire treads wherein the composition comprises a halogenated isobutylene rubber which can be the sole rubber of the composition or one of a combination of rubbers. A preferred embodiment comprises a rubber component comprising 20 to 60 weight percent styrene/butadiene rubber, 20 to 60 weight percent butadiene rubber, and 10 to 30 weight percent of a halogenated rubber, a silica filler, and an organosilane cross-linking agent. It is disclosed that in a preferred embodiment, the rubber compositions comprise 10 to 30 parts per 100 parts rubber of untreated, precipitated silica employed with an effective amount of organosilane coupling agent, for example, 1 to 8 parts per hundred rubber. However, the green strength properties of the isobutylene rubber or blends thereof are not significantly improved.

The prior art has not addressed the full complement of green strength properties. The present application provides for a novel composition which addresses the present need for improved green strength.

SUMMARY OF THE INVENTION

In accordance with the present invention, an embodiment is directed to a blend comprising an isobutylene-based polymer and a semi-crystalline polymer (SCP) which improves green strength properties with reduced damage to barrier or oxidative heat aging properties. The semi-crystalline polymers are generally semi-compatible with isobutylene based polymers and have crystalline melting points below the temperatures used in the mixing and shaping operations. Another embodiment comprises a barrier membrane comprising an isobutylene based polymer and a semi-crystalline polymer wherein the semi-crystalline propylene polymer comprises a melting point of from about 25° C. to about 105° C. and a heat of fusion from about 9 J/g to about 50 J/g as determined by DSC.

In accordance with another embodiment of the present invention, a blend comprising an isobutylene based polymer and a semi-crystalline propylene polymer having a propylene content at least from about 75 weight percent.

In accordance with a further embodiment, a tire innerliner or innertube comprises a brominated butyl rubber polymer and a semi-crystalline polymer wherein the semi-crystalline propylene polymer comprises a melting point of from about 25° C. to about 105° C. and a heat of fusion from about 9 J/g to about 50 J/g as determined by DSC.

DETAILED DESCRIPTION OF THE INVENTION

In a broad embodiment of the present invention, a blend comprises an isobutylene-based elastomer and a semi-crystalline polymer that exhibits improved green strength, green elongation, and green relaxation properties. A further embodiment of the present invention is a blend comprising any isobutylene-based elastomer and semi-crystalline polymer which exhibits improved aging properties and improved barrier properties. The improvement in green strength according to the invention is achieved without substantial sacrifice of any of the other desirable properties or processability of isobutylene based elastomers and does not interfere with the subsequent curing operations conventionally conducted with isobutylene based elastomers or the usefulness of the vulcanizates so obtained.

It was found that a class of preferably saturated (no backbone unsaturation), semi-crystalline polymers (SCP) can be added to isobutylene based polymers to improve green strength properties with significantly reduced damage to barrier or oxidative heat aging properties. These polymers are generally semi-compatible with isobutylene based polymers and have crystalline melting points below the temperatures used in mixing and shaping operation. However, at handling and some further processing operations, such as tire building, done at temperatures below the crystalline melting point of the semi-crystalline polymers, the green properties can be enhanced.

The preferred semicrystalline polymer is a thermoplastic copolymer, preferably random, of ethylene and propylene having a melting point by DSC analysis of from about 25° C. to about 105° C., preferably in the range of from about 25° C. to about 90° C., more preferably in the range of from about 35° C. to about 80° C. and an average propylene content by weight of from at least about 75% and more preferably from at least about 80%, and most preferably from at least about 90%. A preferred semi crystalline polymer (SCP) used in the present invention is described in detail as the "First Polymer Component (FPC)" in co-pending U.S. application filed May 13, 1999, U.S. Ser. No. 60/133,966, which is incorporated by reference herein for purposes of U.S. practice. The semi-crystalline polymer preferably has a heat of fusion from about 9 J/g to about 50 J/g as determined by DSC, more preferably from about 11 J/g to about 38 J/g as determined by DSC, and most preferably from about 15 J/g to about 25 J/g as determined by Differential Scanning Calorimetry (DSC).

The preferred procedure used in the present application for Differential Scanning Calorimetry (DSC) is described as follows. Preferably, about 6 mg to about 10 mg of a sheet of the preferred polymer pressed at approximately 200° C. to 230° C. is removed with a punch die and is annealed at room temperature for 240 hours. At the end of this period, the sample is placed in a Differential Scanning Calorimeter (Perkin Elmer 7 Series Thermal Analysis System) and cooled to about −50° C. to −70° C. The sample is heated at about 2° C./min to attain a final temperature of about 200° C. to about 220° C. The thermal output is recorded as the area under the melting peak of the sample which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption within the range of melting temperature of the sample.

The semi-crystalline polymer of the polymer blend compositions of the present invention comprises a crystallizable copolymer of propylene and another alpha-olefin having less than 10 carbon atoms, preferably ethylene. The crystallinity of the SCP arises from crystallizable stereoregular propylene sequences. The SCP has the following characteristics:

The SCP of the present invention preferably comprises a random crystallizable copolymer having a narrow compositional distribution. The term "crystallizable," as used herein for SCP, describes those polymers or sequences which are mainly amorphous in the undeformed state, but can crystallize upon stretching, annealing or in the presence of a crystalline polymer. Crystallization is measured by DSC, as described herein. While not meant to be limited thereby, it is believed that the narrow composition distribution of the first polymer component is important. The intermolecular composition distribution of the polymer is determined by thermal fractionation in a solvent. A typical solvent is a saturated hydrocarbon such as hexane or heptane. This thermal fractionation procedure is described below. Typically, approximately 75% by weight and more preferably 85% by weight of the polymer is isolated as a one or two adjacent, soluble fraction with the balance of the polymer in immediately preceding or succeeding fractions. Each of these fractions has a composition (wt. % ethylene content) with a difference of no greater than 20-wt. % (relative) and more preferably 10-wt. % (relative) of the average wt. % ethylene content of the whole first polymer component. The first polymer component is narrow in compositional distribution if it meets the fractionation test outlined above.

In all SCP, the length and distribution of stereoregular propylene sequences is consistent with the substantially random statistical crystallizable copolymerization. It is well known that sequence length and distribution are related to the copolymerization reactivity ratios. By substantially random, we mean copolymer for which the product of the reactivity ratios is generally 2 or less. In stereoblock structures, the average length of PP sequences is greater than that of substantially random copolymers with a similar composition. Prior art polymers with stereoblock structure have a distribution of PP sequences consistent with these blocky structures rather than a random substantially statistical distribution. The reactivity ratios and sequence distribution of the polymer may be determined by C-13 NMR which locates the ethylene residues in relation to the neighboring propylene residues. To produce a crystallizable copolymer with the required randomness and narrow composition distribution, it is desirable to use (1) a single sited catalyst and (2) a well-mixed, continuous flow stirred tank polymerization reactor which allows only a single polymerization environment for substantially all of the polymer chains of the first polymer component.

The SCP preferably has a single broad melting transition. This is determined by DSC. Typically a sample of the SCP will show secondary melting peaks adjacent to principal peak these are considered together as single melting point. The highest of these peaks is considered the melting point. These SCP polymers have a melting point of less than 105° C., preferably less than 100° C. and a heat of fusion of less than 45 J/g preferably less than 35 J/g, more preferably less than 25 J/g, as determined by DSC.

The SCP of the present inventive composition comprises isotactically crystallizable alpha-olefin sequences, e.g., preferably propylene sequences (N). The crystallinity of the first polymer component is, preferably, according to one embodiment, from 1% to 65% of homoisotactic polypropylene, preferably between 3% to 30%, as measured by the heat of fusion of annealed samples of the polymer.

The weight average molecular weight of the SCP can be between 10,000 to 5,000,000 preferably 80,000 to 500,000 with a poly dispersity index (PDI) between 1.5 to 40.0, more preferably between about 1.8 to 5 and most preferably between 1.8 to 3. It is preferred if the SCP has a ML (1+4)@125° C. less than 100, more preferably less than 75 and more preferably less than 60.

The low levels of crystallinity in the SCP are obtained by incorporating from 5%–40% by weight alpha-olefin, preferably from 6%–30% by weight alpha-olefin, and most preferably, it comprises from 8%–25% by weight alpha-olefin and even more preferably between 8%–20%, most preferably between 10%–15% by weight alpha-olefin. These composition ranges for the SCP are dictated by the object of the present invention. Alpha olefins comprise one or more members of the group $C_2$, $C_3$–$C_{20}$ alpha-olefin. When the minor component is lower than the above lower limits for the composition of the SCP, the SCP is thermoplastic and does not have the phase separated morphology required for the tensile recovery properties of the blends. When the minor components are higher than the above higher limits for the SCP, the blends have poor tensile strength and a phase separated morphology with a coarse dispersion. It is believed, while not meant to be limited thereby, the SCP needs to have the optimum amount of isotactic polypropylene crystallinity to crystallize with the IBP for the beneficial effects of the present invention. As discussed above, the preferred alpha-olefin is ethylene.

The fraction of the semi-crystalline polymer in the SCP/IBP blend of the present invention may vary in the range from about 3% to about 95% by weight, preferably in the range from about 3% to about 60% by weight, more preferably in the range from 4% to about 45% by weight, and most preferably from about 5% to about 30% by weight.

More than one semi-crystalline polymer as defined in the present application may be used as the semi-crystalline polymer component of the invention. The number of semi-crystalline polymers in this embodiment preferably is three or less and more preferably, two. The different semi-crystalline polymers may differ in their crystallinity so long as the crystallinity falls within the described ranges.

The crystallinity of the preferred semi-crystalline polymer for blending with isobutylene polymers may also be expressed in terms of crystallinity percent. The thermal energy for the crystalline melting point of the highest order of polypropylene is estimated at 189 J/g. That is, 100% crystallinity is equal to 189 J/g. Therefore, according to the aforementioned energy levels, the present invention preferably has a polypropylene crystallinity of about 5% to about 30%, more preferably from about 6% to about 20%, and most preferably from about 8% to about 15%. The preferred polymer has a molecular weight less than or equal to 30, expressed by Mooney viscosity as ML(1+4) at 125° C. The Mooney viscosity test referred to herein is in accordance with ASTM D-1646. The semi crystalline polymer is preferably a random copolymer produced from propylene monomers, one or more other monomers selected from the group consisting of ethylene, alpha-olefins having 4 to 8 carbon atoms, styrenes and, optionally, one or more dienes. The semicrystalline polymer component may contain small quantities of at least one diene, and more preferably at least one of the dienes is a non-conjugated diene to aid in the vulcanization and other chemical modification. The amount of diene is limited to be no greater than about 10 wt % and preferably no greater than about 5 wt %. The diene may be selected from the group consisting of those that are used for the vulcanization of ethylene propylene rubbers and preferably ethylidene norbornene, vinyl norbornene, dicyclopentadiene, and 1,4-hexadiene(available from DuPont Chemicals).

A second component of the blends described above is an isobutylene based elastomeric copolymer. Preferably, isobutylene based polymers, more preferably halogenated isobutylene based polymers and most preferably, brominated butyl rubber, including star branched butyl rubber, are employed in the present invention. The aforementioned list of isobutylene based polymers are available from Exxon-Mobil Chemical Co. and described in U.S. Pat. Nos. 2,631,984, 2,964,489, 3,099,644, and 5,021,509 and incorporated herein by reference for U.S. practice. The isobutylene based polymer may be selected from the group consisting of butyl rubber, polyisobutylene, random copolymers of a $C_4$ to $C_7$ isomonoolefin and a para-alkylstyrene, such as EXXPRO™, available from ExxonMobil Chemical Co. and described in U.S. Pat. Nos. 5,162,445, 5,430,118, 5,426,167, 5,548,023, 5,548,029, and 5,654,379 and incorporated herein by reference for U.S. practice, and blends thereof. However, the scope of the present invention is not limited to the aforementioned compositions and may include any isobutylene based elastomeric polymer.

The following data demonstrates improvements in green properties with little consequence to barrier or cured properties for the inventive blends. Moreover, the data suggest that blending of low molecular weight SCP with IBP may enable reduction in plasticizer levels, such as oil and STRUKTOL MS-40, available from Struktol Chemicals, Akron, Ohio, to further reduce barrier disadvantages while maintaining good compound processability. In a preferred embodiment, low molecular weight polyisobutylene polymer, i.e. polyisobutylene oil, is used as a plasticizer. Plasticizers are added for obtaining acceptable processing characteristics such as mixing, milling, calendering, extrusion and molding. When low molecular weight SCP are added they can also act as plasticizers while the crystallinity of the SCP maintains improved green properties even at lower molecular weight.

Suitable barrier membranes, such as tire innerliner and innertube compositions, may be prepared by using conventional mixing techniques including, e.g., kneading, roller milling, extruder mixing, internal mixing (such as with a Banbury® mixer), etc. The sequence of mixing and temperatures employed are well known to the skilled rubber compounder, the objective being the dispersion of polymers, fillers, activators and curatives in the polymer matrix without excessive heat buildup. A useful mixing procedure utilizes a Banbury mixer in which the polymeric components, fillers, and plasticizer are added and the composition mixed for the desired time to a particular temperature to achieve adequate dispersion of the ingredients. Alternatively, the polymers and a portion of the fillers (e.g., one-third to two-thirds) are mixed for a short time (e.g. about 1 to 3 minutes) followed by the remainder of the fillers and oil. Mixing is continued for about 5 to 10 minutes at high rotor speed during which time the mixed components reach a temperature of about 150 ° C. Following cooling, the components are mixed in a second step on a rubber mill or in a Banbury mixer during which the curing agent and optional accelerator are thoroughly and uniformly dispersed at a relatively low temperature, e.g., about 80° to about 105° C. Variations in mixing will be readily apparent to those skilled in the art and the present invention is not limited to any specific mixing procedure. The mixing is performed to disperse all components of the composition thoroughly and uniformly.

The improved green strength blend of the present invention can be compounded alone or blended with other rubbers and processed with the same ingredients and the same procedures as used with conventional brominated butyl rubber, i.e. with fillers such as carbon black, silica or clay, with plasticizers, extender oils, such as isobutylene oil, and tackifiers and with vulcanizing agents such as zinc oxide and/or sulfur with or without additional vulcanization accelerations. Such other rubbers with which the green strength brominated butyl of this invention may be blended include those with which brominated butyl may be blended such as the unsaturated rubbers including natural rubber, polyisobutylene rubber, ethylene co-polymers, such as ethylene cycloolefin and ethylene isobutylene copolymers, styrene-butadiene rubber, polybutadiene, polyisoprene and styrene-butadiene polymers and the lesser unsaturated rubbers such as ethylene-propylene-diene polymers (EPDM). EPDM is the ASTM designation for a terpolymer of ethylene, propylene and a non-conjugated diolefin. A preferred EPDM terpolymer is VISTALON 2200® grade, available from Exxon Chemical Company. Additional acceptable polymers are described in U.S. Pat. Nos. 5,763,556 and 5,866,665, which are incorporated herein by reference for purposes of U.S. practice.

The improved green strength blend of the present invention, alone or blended with other rubbers, may be cured by reaction with curatives well known in the art; the amounts of such curatives being those conventionally used. Generally, polymer blends, e.g., those used to produce tires, are often crosslinked. It is known that the physical properties, performance characteristics, and durability of vulcanized rubber compounds are directly related to the number (crosslink density) and type of crosslinks formed during the vulcanization reaction. (See, e.g., *The Post Vulcanization Stabilization for NR*, W. E Helt, B. H. To & W. W. Paris, Rubber World, Aug. 1991, pp. 18–23 which is incorporated by reference herein.) Generally, polymer blends may be crosslinked by adding curative molecules, for example sulfur, zinc, metals, radical initiators, etc. followed by heating. This method may be accelerated and is often used for the vulcanization of elastomer blends. The mechanism for accelerated vulcanization of natural rubber involves complex interactions between the curative, accelerator, activators and polymers. Ideally, the entire available curative is consumed in the formation of effective crosslinks that join together two polymer chains and enhance the overall strength of the polymer matrix. Numerous curatives are known in the art and include, but are not limited to, the following: zinc oxide, stearic acid, tetramethylthiuram disulfide (TMTD), 4,4'-dithiodimorpholine (DTDM), tetrabutylthiuram disulfide (TBTD), benzothiazyl disulfide (MBTS), hexamethylene-1,6-bisthiosulfate disodium salt dihydrate (ERP 390), 2-(morpholinothio) benzothiazole (MBS or MOR), blends of 90% MOR and 10% MBTS (MOR 90), N-oxydiethylene thiocarbamyl-N-oxydiethylene sulfonamide (OTOS) zinc 2-ethyl hexanoate (ZEH); and MC sulfur. In addition, various vulcanization systems are known in the art. (For example, see *Formulation Design and Curing Characteristics of NBR Mixes for Seals*, Rubber World, September 1993, pp. 25–30, which is incorporated by reference herein). The amount of other compounding ingredients is within the ranges known in the art.

For the purposes of this disclosure properties have been determined as follows:

I. Green strength/stress relaxation

The green strength tests follow the guidelines set by ASTM D412-87.

A. Sample preparation. Test pad samples are prepared from a 102×102×6.0 mm milled sample weighing approximately 85±5 grams. The uncured sample is placed between Mylar sheets in a room temperature mold, noting the direction of the mill grain. The mold is loaded in a curing press set at approximately 100° C. and pressed for a total of approximately five minutes; two minutes at low pressure (approximately 7800 lbs.) and three minutes at high pressure (30,000 lbs.). The molded pad is then removed and allowed to condition at room temperature for at least approximately 24 hours before testing.

B. Testing. The standard test temperature is preferably 23±2° C. (open laboratory atmosphere) or 40° C. Samples are tested using an Instron tester having the following settings:

Load Cell: 1000 Newtons
Pneumatic jaws: set at 30-psi air pressure
Crosshead speed: 127 mm/min
Chart Speed: 50 mm/min
Full Scale: 25 Newtons
Jaw separation: 25 mm The Mylar backing is removed from each side of the sample, preferably by using acetone. The sample thickness is measured and marked with a 25-mm benchmark. The ends of the sample are covered with Mylar on each side to prevent adhesion to the jaws. The sample is placed in the jaws of the tester, aligning the benchmark with the top and bottom edges of the jaws. The sample is stretched 100% (from 25 to 50 mm jaw separation) or 200% (from 25 to 75 mm jaw separation). The tensile force is monitored after deformation is stopped until the tensile force exceeds the point at which the force decays by 75% (to 25% of the value after the crosshead is stopped).

C. Calculations. Using sample dimensions (width and thickness) and force data, calculate:

(i.) Green strength: stress at 100% (at the point the crosshead stopped).

$N/mm^2$ =Force (N)/sample width X thickness (mm).

(ii.) Relaxation Time (t75): from the recorder chart compute the time it took for the stress (force) to decay by 75% (from its value when relaxation started to the point the stress decayed to 25% of this value). The time should be counted after the crosshead stopped (it should exclude the deformation time of 12 sec).

(iii.) Test three (3) good specimens for each compound. Report the mean as green strength and time to 75% decay.

D. Normalization. Green strength and stress relaxation values obtained for various materials can be normalized against a given material. This is accomplished by dividing each resulting reference stress by the reference stress for the standard material. The normalization should be done for measurements using identical parameters. However, after normalization, materials measured with one or more changes in the test parameters can still be compared if the standard material is the same material and was measured with both sets of parameters. For example, if the extent of decay is 75 percent in one set of tests and 50 percent in another set, both sets can be normalized against the same standard which is itself measured under both conditions. Since decay follows an exponential form, a normalized relaxation time is not strongly dependent on the extent of decay.

Further descriptions of the testing procedures are described in U.S. Pat. No. 5,071,913, fully incorporated herein by reference.

The following example includes data that illustrates the improvements found to green elongation, green strength and relaxation integrity in barrier membranes and blends in general, such as tire innerliner model compounds. The barrier membranes and blends produced with the aforementioned composition may be used in the manufacture of articles, preferably curable articles and/or vulcanizates, such tire innerliners, tire innertubes, pharmaceutical stoppers, roof sheeting, belts, tubes, hoses, and so on. The barrier membrane may be used to prevent gas or fluid intrusion or leakage.

The present invention, while not meant to be limited by, may be better understood by reference to the following example and Tables.

EXAMPLE 1

A series of compounds were mixed in an internal mixer using a model formulation. The compounds were based on either one out of four bromobutyl rubbers (#1–4), or blends of two of the bromobutyl rubbers with the semi-crystalline polymer according to the present (#5–18), or with an amorphous polymer (an EPDM rubber, VISTALON 2200® having a molecular weight less than or equal to 33, expressed by Mooney viscosity as ML(1+4) at 125° C. The Mooney viscosity test referred to herein is in accordance with ASTM D-1646.) (commercially available from Exxon Chemical Company, Baytown, Tex.), commonly used in innertubes blends, #19–20)), or with natural rubber (#21). The SCP was introduced at levels of either 15 or 20 phr, the amorphous polymer was introduced at 20 phr and the NR was introduced at 25 phr as shown in the Table 1. Oil was introduced at 0, 5 or 10 phr and carbon black was introduced at 60, 70 or 80 phr.

The cure system shown in the Table 1 was incorporated on a mill.

Green properties of the compounds without the cure system components were measured at room temperature and at 50° C. It was found that for consistent results the samples for green properties testing had to be carefully calendered before molding. Samples were cut out of molded pads into strips of 2.5 inches long, 0.5 inch wide and about 0.1 inch thick, such that the length of the samples corresponded to the direction of the calendered sheet leaving the calender. In all tests the strips were clamped in a tensile tester such that the distance between the grips was 1 inch. The test conducted at room temperature was a stress relaxation test where the strip was extended by 100% of its original length between the grips at a rate of 5 inches per minute after which the relaxing stress was recorded with time. The tests conducted at 50° C. included a stress relaxation test as above where the sample was extended by 200% of its original length between the grips. A green tensile test was also conducted at 50° C. For the tensile tests the same sample and test configuration was used with the sample pulled to break at a rate of 10 inches per minute. All tests were carried on in triplicates with the median value being the recorded one.

The results for room temperature green stress relaxation are expressed as the "green strength" (GS) in Tables 2 and 3. The green strength may be defined as being the stress at the end of extension (100% extension) and the time to relax the stress by 75% from either the stress at the end of extension or the peak stress which occurs at lower extension. The time was measured from the instant the extension was stopped. The green strength test at 50° C. uses similar parameters to the room temperature test but the relaxation time to 75% in stress drop was based on the peak stress only. The residual stress (RS) at 2 minutes after the start of extension was also recorded (Modulus at 2 minutes). The parameters recorded for the 50° C. green tensile test were 100% modulus, peak stress, and % elongation at break. The same parameters were also recorded for the median sample and the maximum sample. The results for green properties are given in Table 1 and for selected samples according to the present invention in the stress-time and stress-strain traces at 50° C. in Tables 2 and 3.

For room temperature Green Strength (GS) it can be seen that all samples with SCP have higher GS. Samples #1 and #4 representing the lowest molecular weight bromobutyl and the star-branched bromobutyl without a second polymer showed the fastest relaxation time. For the 50° C. GS the relative ranking is similar but the relaxation times are much closer between the compounds containing a second polymers and those not containing a second polymer. A large increase in elongation to break at 50° C. is shown by all compounds containing 20 phr SCP.

The higher elongation is important for maintaining material integrity when processing calendered sheets at higher temperature. The higher green strength also helps in handling by helping reducing deformation during processing.

TABLE 1

|  | #1 | #2 | #3 | #4 | #5 | #6 | #7 | #8 | #9 | #10 |
|---|---|---|---|---|---|---|---|---|---|---|
| 86-6, BrSBB[1] | 0 | 0 | 0 | 100 | 0 | 0 | 0 | 80 | 80 | 80 |
| BIIR 2222[2] | 100 | 0 | 0 | 0 | 80 | 80 | 80 | 0 | 0 | 0 |
| BIIR 2235[3] | 0 | 100 | 0 | 0 | 0 | 0 | 0 | 0 | 0 | 0 |
| BIIR 2255[4] | 0 | 0 | 100 | 0 | 0 | 0 | 0 | 0 | 0 | 0 |
| Natural Rubber | 0 | 0 | 0 | 0 | 0 | 0 | 0 | 0 | 0 | 0 |
| Semi-Crystalline Polymer | 0 | 0 | 0 | 0 | 20 | 20 | 20 | 20 | 20 | 20 |

TABLE 1-continued

| | | | | | | | | | | |
|---|---|---|---|---|---|---|---|---|---|---|
| Amorphous Polymer EPDM | 0 | 0 | 0 | 0 | 0 | 0 | 0 | 0 | 0 | 0 |
| FLEXON 876[5] | 10 | 10 | 10 | 10 | 0 | 5 | 10 | 0 | 5 | 10 |
| 40 MS Struktol | 5 | 5 | 5 | 5 | 5 | 5 | 5 | 5 | 5 | 5 |
| N 660 Carbon Black | 60 | 60 | 60 | 60 | 60 | 60 | 60 | 60 | 60 | 60 |
| Resin 1068[6] | 4 | 4 | 4 | 4 | 4 | 4 | 4 | 4 | 4 | 4 |
| HSt | 2 | 2 | 2 | 2 | 2 | 2 | 2 | 2 | 2 | 2 |
| MgO, Meglite K | 0.15 | 0.15 | 0.15 | 0.15 | 0.15 | 0.15 | 0.15 | 0.15 | 0.15 | 0.15 |
| Cure System | | | | | | | | | | |
| ZnO | 3.0 | 3.0 | 3.0 | 3.0 | 3.0 | 3.0 | 3.0 | 3.0 | 3.0 | 3.0 |
| S | 0.5 | 0.5 | 0.5 | 0.5 | 0.5 | 0.5 | 0.5 | 0.5 | 0.5 | 0.5 |
| MBTS[7] | 1.5 | 1.5 | 1.5 | 1.5 | 1.5 | 1.5 | 1.5 | 1.5 | 1.5 | 1.5 |

| | #11 | #12 | #13 | #14 | #15 | #16 | #17 | #18 | #19 | #20 |
|---|---|---|---|---|---|---|---|---|---|---|
| 86-6, BrSBB[1] | 0 | 0 | 80 | 80 | 0 | 85 | 85 | 85 | 0 | 80 |
| BIIR 2222[2] | 0 | 0 | 0 | 0 | 85 | 0 | 0 | 0 | 80 | 0 |
| BIIR 2235[3] | 80 | 80 | 0 | 0 | 0 | 0 | 0 | 0 | 0 | 0 |
| BIIR 2255[4] | 0 | 0 | 0 | 0 | 0 | 0 | 0 | 0 | 0 | 0 |
| Natural Rubber | 0 | 0 | 0 | 0 | 0 | 0 | 0 | 0 | 0 | 0 |
| Semi-Crystalline Polymer | 20 | 20 | 20 | 20 | 15 | 15 | 15 | 15 | 0 | 0 |
| Amorphous Polymer EPDM | 0 | 0 | 0 | 0 | 0 | 0 | 0 | 0 | 20 | 20 |
| FLEXON 876[5] | 10 | 10 | 10 | 10 | 10 | 10 | 10 | 10 | 10 | 10 |
| 40 MS Struktol | 5 | 5 | 5 | 5 | 5 | 5 | 5 | 5 | 5 | 5 |
| N 660 Carbon Black | 70 | 80 | 70 | 80 | 60 | 60 | 70 | 80 | 60 | 60 |
| Resin 1068[6] | 4 | 4 | 4 | 4 | 4 | 4 | 4 | 4 | 4 | 4 |
| HSt | 2 | 2 | 2 | 2 | 2 | 2 | 2 | 2 | 2 | 2 |
| MgO, Meglite K | 0.15 | 0.15 | 0.15 | 0.15 | 0.15 | 0.15 | 0.15 | 0.15 | 0.15 | 0.15 |
| Cure System | | | | | | | | | | |
| ZnO | 3.0 | 3.0 | 3.0 | 3.0 | 3.0 | 3.0 | 3.0 | 3.0 | 3.0 | 3.0 |
| S | 0.5 | 0.5 | 0.5 | 0.5 | 0.5 | 0.5 | 0.5 | 0.5 | 0.5 | 0.5 |
| MBTS[7] | 1.5 | 1.5 | 1.5 | 1.5 | 1.5 | 1.5 | 1.5 | 1.5 | 1.5 | 1.5 |

[1]MDB 86-6 ™ BrSBB is brominated star branched butyl rubber available from Exxon Chemical Company
[2]BIIR ™ 2222 is brominated butyl rubber, Exxon Chemical Co.
[3]BIIR ™ 2235 is brominated butyl rubber, Exxon Chemical Co.
[4]BIIR ™ 2255 is brominated butyl rubber, Exxon Chemical Co.
[5]FLEXON ™ is paraffinic oil, Exxon Chemical Co.
[6]RESIN ™ 1068 is a resin available from Schenectady Chemical Co., Schenectady, NY
[7]MBTS ™ is 2,2' benzothiazyl disulfide.

Processability during mixing, milling and calendering (or other high temperature green compound shaping such as extrusion) was improved for the semi-crystalline polymer blends as experienced during sample preparation for this example. Some of this behavior can be demonstrated in capillary flow as shown in the Tables 4 and 5. Capillary extrusion was conducted in a Monsanto Processability Tester (MPT) instrument commercially available from Alpha Technologies of Akron, Ohio, at 1 00° C. The lower die swell at high shear rates of the SCP blends vs. the 100% bromobutyl formulations indicate reduced elasticity in processing which is helpful in shaping operations, even when high shear viscosities are similar. Viscosities may be also reduced by using a molecular weight semi-crystalline polymer, preferably having a Mooney range from 5 to 40, which can act as a plasticizer above the crystalline melting point but the crystalline enhancement of properties can be still experienced at such lower molecular weight semi crystalline polymers.

Cured physical properties shown in the Tables 1, 6, 7 and 8, show an increase in hardness for the semi-crystalline polymer blends with lower relative changes in cured properties after aging, particularly in hardness and modulus.

An important property for isobutylene based polymers in gas containing applications is air permeability. The data in the following tables establishes improved air permeability when blending isobutylene based polymers with the semi-crystalline polymer disclosed in this application as compared to natural rubber or amorphous polymers and blends thereof As shown in Tables 7 and 8, it can be seen that reducing oil levels can reduce permeability significantly, while an increase in carbon black level is only slightly advantageous. Since some low molecular weight semi crystalline polymers can act as plasticizers, oil levels can be reduced to improve barrier properties without impacting processing operations.

TABLE 2

| | Sample ID A | | | | | | | | | |
|---|---|---|---|---|---|---|---|---|---|---|
| | #1 | #2 | #3 | #4 | #5 | #6 | #7 | #8 | #9 | #10 |
| Green Strength (100%), MPa | 0.255 | 0.304 | 0.313 | 0.289 | 0.750 | 0.638 | 0.558 | 0.808 | 0.672 | 0.526 |
| t75 on peak, Min | 1.170 | 2.307 | 3.042 | 1.308 | 8.000 | 6.157 | 5.539 | 8.000 | 8.000 | 4.702 |

TABLE 2-continued

| | | | | | | | | | | |
|---|---|---|---|---|---|---|---|---|---|---|
| t75 on Strain Endpoint, Min | 1.387 | 2.658 | 3.430 | 1.681 | 8.000 | 8.000 | 7.200 | 8.000 | 8.000 | 6.022 |
| % Drop from Strain Endpoint @ 8 Min | — | — | — | — | 72.4 | 74.6 | — | 73.1 | 72.9 | — |

| | Sample ID A | | | | | | | | | |
|---|---|---|---|---|---|---|---|---|---|---|
| | #11 | #12 | #13 | #14 | #15 | #16 | #17 | #18 | #19 | #20 |
| Green Strength (100%), MPa | 0.679 | 0.756 | 0.639 | 0.740 | 0.430 | 0.450 | 0.530 | 0.643 | 0.382 | 0.414 |
| t75 on peak, Min | 8.000 | 7.863 | 6.553 | 8.000 | 2.987 | 2.914 | 3.078 | 4.638 | 2.245 | 2.510 |
| t75 on Strain Endpoint, Min | 8.000 | 8.000 | 8.000 | 8.000 | 3.785 | 4.410 | 3.763 | 6.630 | 2.627 | 2.892 |
| % Drop from Strain Endpoint @ 8 Min | 73.5 | 73.8 | 74.9 | 73.2 | — | — | — | — | — | — |

*Green Strength Tests were run at Room Temperature, 100%, 2.5" × 0.5" Calendered Samples, 1" between grips, 5 in/min As can be seen, the green strength is dramatically improved in test run #8, which contains approximately 20% by weight semi-crystalline polymer

TABLE 3

| | Sample ID A | | | | | | | | | |
|---|---|---|---|---|---|---|---|---|---|---|
| | #1 | #2 | #3 | #4 | #5 | #6 | #7 | #8 | #9 | #10 |
| Green Strength Tests | 50° C., 200%, 2.5" × 0.5" Calendered Samples, 1" between grips, 5 in/min | | | | | | | | | |
| Green Strength (100%), MPa | 0.172 | 0.206 | 0.220 | 0.191 | 0.401 | 0.344 | 0.307 | 0.457 | 0.360 | 0.289 |
| t75 on peak, Min | 0.540 | 0.825 | 1.478 | 0.752 | 3.581 | 2.114 | 3.252 | 3.862 | 4.991 | 2.426 |
| Stress at Strain endpoint (200%), Mpa | 0.112 | 0.141 | 0.163 | 0.133 | 0.319 | 0.257 | 0.238 | 0.363 | 0.288 | 0.223 |
| Mod. @ 2 Min, Mpa (R.S.*) | 0.031 | 0.043 | 0.061 | 0.040 | 0.135 | 0.101 | 0.099 | 0.155 | 0.123 | 0.091 |
| Tensile Tests | 50° C., 2.5" × 0.5" Calendered Samples, 1" between grips, 10 in/min | | | | | | | | | |
| 100% Mod., MPa | 0.216 | 0.238 | 0.256 | 0.224 | 0.438 | 0.378 | 0.315 | 0.486 | 0.375 | 0.328 |
| Peak Stress, MPa | 0.242 | 0.268 | 0.28 | 0.258 | 0.491 | 0.416 | 0.343 | 0.523 | 0.406 | 0.352 |
| Elongation, % | 264 | 338 | 406 | 369 | 724 | 615 | 1133 | 510 | 1016 | 838 |
| (Max) % | 294 | 353 | 414 | 376 | 833 | 685 | 1143 | 515 | 1035 | 1096 |

| | Sample ID A | | | | | | | | | |
|---|---|---|---|---|---|---|---|---|---|---|
| | #11 | #12 | #13 | #14 | #15 | #16 | #17 | #18 | #19 | #20 |
| Green Strength Tests | 50° C., 200%, 2.5" × 0.5" Calendered Samples, 1" between grips, 5 in/min | | | | | | | | | |
| Green Strength (100%), MPa | 0.393 | 0.432 | 0.352 | 0.396 | 0.261 | 0.268 | 0.312 | 0.369 | 0.238 | 0.261 |
| t75 on peak, Min | 2.644 | 3.492 | 2.621 | 3.580 | 1.279 | 1.686 | 1.436 | 0.985 | 0.996 | 1.008 |
| Stress at Strain endpoint (200%), Mpa | 0.289 | 0.340 | 0.270 | 0.316 | 0.200 | 0.200 | 0.226 | 0.252 | 0.164 | 0.181 |
| Mod. @ 2 Min, Mpa (R.S.*) | 0.118 | 0.135 | 0.105 | 0.128 | 0.068 | 0.074 | 0.085 | 0.090 | 0.056 | 0.062 |
| Tensile Tests | 50° C., 2.5" × 0.5" Calendered Samples, 1" between grips, 10 in/min | | | | | | | | | |
| 100% Mod., MPa | 0.424 | 0.471 | 0.368 | 0.43 | 0.279 | 0.293 | 0.329 | 0.409 | 0.265 | 0.268 |
| Peak Stress, MPa | 0.451 | 0.514 | 0.409 | 0.467 | 0.311 | 0.323 | 0.365 | 0.468 | 0.292 | 0.295 |
| Elongation, % | 505 | 444 | 521 | 471 | 341 | 341 | 282 | 326 | 293 | 341 |
| (Max) % | 863 | 576 | 526 | 804 | 342 | 345 | 290 | 357 | 337 | 382 |

TABLE 4

| | Sample ID A | | | | | | | | | |
|---|---|---|---|---|---|---|---|---|---|---|
| | #1 | #2 | #3 | #4 | #5 | #6 | #7 | #8 | #9 | #10 |
| | Shear Rate: 36, 1/Sec | | | | | | | | | |
| Barrel Pressure, PSI | 2280 | 2490 | 2570 | 2290 | 2730 | 2280 | 2030 | 2600 | 2320 | 1910 |
| Shear Stress, Kpa | 197 | 215 | 221 | 197 | 235 | 197 | 175 | 224 | 200 | 165 |
| Viscosity, Kpa*Sec | 5.41 | 5.91 | 6.1 | 5.43 | 6.48 | 5.41 | 4.82 | 6.17 | 5.5 | 4.53 |
| Run Die Swell, % | 12 | 12.5 | 12.7 | 12.5 | 12.4 | 12.5 | 12.2 | 11.8 | 13.2 | 13.4 |
| Relax Die Swell, % | 16.1 | 15.7 | 15.2 | 16.1 | 16.2 | 16.4 | 16.6 | 18.4 | 18.3 | 16.9 |
| | Shear Rate: 178, 1/Sec | | | | | | | | | |
| Barrel Pressure, PSI | 3130 | 3290 | 3340 | 3170 | 4320 | 3730 | 3340 | 4280 | 3760 | 3180 |
| Shear Stress, Kpa | 270 | 284 | 288 | 273 | 372 | 321 | 288 | 369 | 324 | 274 |
| Viscosity, Kpa*Sec | 1.52 | 1.59 | 1.62 | 1.54 | 2.09 | 1.81 | 1.62 | 2.07 | 1.82 | 1.54 |

TABLE 4-continued

| | | | | | | | | | | |
|---|---|---|---|---|---|---|---|---|---|---|
| Run Die Swell, % | 15.2 | 14.9 | 15.7 | 13.5 | 14.9 | 14.4 | 13.7 | 13.2 | 14.0 | 14.7 |
| Relax Die Swell, % | 20.6 | 22.7 | 25.2 | 21.2 | 23.0 | 21.3 | 20.8 | 18.3 | 24.7 | 21.0 |

| | Sample ID A | | | | | | | | | |
|---|---|---|---|---|---|---|---|---|---|---|
| | #11 | #12 | #13 | #14 | #15 | #16 | #17 | #18 | #19 | #20 |
| | Shear Rate: 36, 1/Sec | | | | | | | | | |
| Barrel Pressure, PSI | 2160 | 2220 | 2080 | 2190 | 2050 | 2070 | 2130 | 2290 | 2760 | 2700 |
| Shear Stress, Kpa | 186 | 191 | 179 | 189 | 177 | 178 | 184 | 197 | 238 | 233 |
| Viscosity, Kpa*Sec | 5.12 | 5.27 | 4.93 | 5.2 | 4.86 | 4.91 | 5.05 | 5.43 | 6.55 | 6.41 |
| Run Die Swell, % | 11.7 | 9.6 | 11 | 10.2 | 11.7 | 11.5 | 8.8 | 7.4 | 12 | 13.2 |
| Relax Die Swell, % | 14.6 | 15.1 | 14 | 13.7 | 18.6 | 16.2 | 13.7 | 11.7 | 18.3 | 20.3 |
| | Shear Rate: 178, 1/Sec | | | | | | | | | |
| Barrel Pressure, PSI | 3600 | 3900 | 3530 | 3880 | 3270 | 3320 | 3550 | 3990 | 4210 | 4250 |
| Shear Stress, Kpa | 310 | 336 | 304 | 334 | 282 | 286 | 306 | 344 | 363 | 366 |
| Viscosity, Kpa*Sec | 1.74 | 1.89 | 1.71 | 1.88 | 1.58 | 1.61 | 1.72 | 1.93 | 2.04 | 2.06 |
| Run Die Swell, % | 13.2 | 11.5 | 13.5 | 10.2 | 12.9 | 11.5 | 9.6 | 8.0 | 13.9 | 14.7 |
| Relax Die Swell, % | 21.8 | 20.1 | 18.4 | 21.2 | 23.2 | 20.3 | 15.4 | 15.1 | 22.3 | 19.1 |

TABLE 5

| | Sample ID A | | | | | | | | | |
|---|---|---|---|---|---|---|---|---|---|---|
| | #1 | #2 | #3 | #4 | #5 | #6 | #7 | #8 | #9 | #10 |
| | Shear Rate: 538, 1/Sec | | | | | | | | | |
| Barrel Pressure, PSI | 3950 | 4300 | 4490 | 4080 | 5360 | 4630 | 4140 | 5330 | 4670 | 3960 |
| Shear Stress, Kpa | 340 | 371 | 387 | 352 | 462 | 399 | 357 | 459 | 402 | 341 |
| Viscosity, Kpa*Sec | 0.63 | 0.69 | 0.72 | 0.65 | 0.86 | 0.74 | 0.66 | 0.85 | 0.75 | 0.64 |
| Run Die Swell, % | 20.6 | 22.5 | 24.7 | 20.6 | 17.6 | 17.8 | 17.1 | 15.6 | 17.6 | 18.3 |
| Relax Die Swell, % | 27.4 | 28.1 | 31.1 | 25.9 | 23.0 | 24.5 | 24.2 | 25.2 | 27.1 | 23.0 |
| | Shear Rate: 1079, 1/Sec | | | | | | | | | |
| Barrel Pressure, PSI | 5020 | 5820 | 6320 | 5210 | 6660 | 5670 | 5050 | 6580 | 5720 | 4780 |
| Shear Stress, Kpa | 433 | 502 | 545 | 449 | 574 | 489 | 435 | 567 | 493 | 412 |
| Viscosity, Kpa*Sec | 0.40 | 0.47 | 0.51 | 0.42 | 0.53 | 0.45 | 0.40 | 0.53 | 0.46 | 0.38 |
| Run Die Swell, % | 28.3 | 29.3 | 30.3 | 25.9 | 21.8 | 22.2 | 21.8 | 22.3 | 20.3 | 23.0 |
| Relax Die Swell, % | 33.7 | 39.1 | 40.4 | 33.0 | 30.8 | 31.5 | 31.5 | 29.6 | 28.3 | 29.4 |

| | Sample ID A | | | | | | | | | |
|---|---|---|---|---|---|---|---|---|---|---|
| | #11 | #12 | #13 | #14 | #15 | #16 | #17 | #18 | #19 | #20 |
| | Shear Rate: 538, 1/Sec | | | | | | | | | |
| Barrel Pressure, PSI | 4550 | 4910 | 4380 | 4810 | 4090 | 4150 | 4440 | 5000 | 5080 | 5120 |
| Shear Stress, Kpa | 392 | 423 | 377 | 415 | 352 | 358 | 383 | 431 | 438 | 441 |
| Viscosity, Kpa*Sec | 0.73 | 0.79 | 0.7 | 0.77 | 0.66 | 0.67 | 0.71 | 0.8 | 0.81 | 0.82 |
| Run Die Swell, % | 17.6 | 15.6 | 16.1 | 15.2 | 17.3 | 16.1 | 13.7 | 11.8 | 16.9 | 16.8 |
| Relax Die Swell, % | 24.2 | 21.2 | 20.8 | 21.3 | 26.7 | 21.7 | 19.8 | 14.7 | 26.2 | 27.7 |
| | Shear Rate: 1079, 1/Sec | | | | | | | | | |
| Barrel Pressure, PSI | 5730 | 6140 | 5310 | 5820 | 5000 | 5050 | 5410 | 6120 | 6020 | 6040 |
| Shear Stress, Kpa | 494 | 529 | 458 | 502 | 431 | 435 | 466 | 527 | 519 | 521 |
| Viscosity, Kpa*Sec | 0.46 | 0.49 | 0.42 | 0.47 | 0.40 | 0.40 | 0.43 | 0.49 | 0.48 | 0.48 |
| Run Die Swell, % | 22.0 | 18.1 | 20.0 | 18.8 | 22.7 | 18.6 | 17.9 | 14.6 | 21.0 | 21.3 |
| Relax Die Swell, % | 29.1 | 23.4 | 24.5 | 25.0 | 29.4 | 27.4 | 24.2 | 21.3 | 27.6 | 28.1 |

TABLE 6

| | Sample ID A | | | | | | | | | |
|---|---|---|---|---|---|---|---|---|---|---|
| | #1 | #2 | #3 | #4 | #5 | #6 | #7 | #8 | #9 | #10 |
| | ODR 160° C., 60 min, 3° Arc | | | | | | | | | |
| MH, dNm | 34.90 | 38.96 | 40.45 | 33.18 | 32.60 | 28.24 | 25.16 | 31.05 | 27.32 | 23.39 |
| ML, dNm | 8.770 | 10.81 | 12.25 | 9.12 | 11.36 | 9.03 | 7.89 | 10.89 | 9.25 | 7.26 |
| Ts2, min | 4.03 | 3.37 | 3.53 | 4.73 | 3.88 | 4.14 | 4.69 | 4.15 | 4.76 | 5.37 |
| T90, min | 29.6 | 25.52 | 28.04 | 26.75 | 32.79 | 33.7 | 29.74 | 30.75 | 30.04 | 29.54 |

TABLE 6-continued

Die C, 50° C.

|                      |      |      |      |      |      |      |      |       |      |      |
|----------------------|------|------|------|------|------|------|------|-------|------|------|
| Peak Load, N         | 70.0 | 86.8 | 69.5 | 78.0 | 95.3 | 89.8 | 99.2 | 102.1 | 97.9 | 96.4 |
| Tear Resistance, N/mm| 35.5 | 34.2 | 32.7 | 33.8 | 40.5 | 38.5 | 39.8 | 43.1  | 38.0 | 42.8 |

Die C, 80° C.

|                      |      |      |      |      |      |      |      |      |      |      |
|----------------------|------|------|------|------|------|------|------|------|------|------|
| Peak Load, N         | 54.3 | 82.3 | 66.0 | 89.2 | 56.5 | 54.2 | 59.7 | 54.3 | 56.6 | 45.5 |
| Tear Resistance, N/mm| 30.7 | 28.7 | 28.5 | 35.6 | 23.3 | 20.9 | 22.0 | 21.2 | 20.0 | 19.1 |

Tensile, Non Aging, Test Temperature: Room Temp

|                   |        |        |       |       |       |        |        |        |       |       |
|-------------------|--------|--------|-------|-------|-------|--------|--------|--------|-------|-------|
| 100% Mod., Mpa    | 1.198  | 1.282  | 1.331 | 1.29  | 2.623 | 2.367  | 2.041  | 2.751  | 2.32  | 1.94  |
| 200% Mod., Mpa    | 2.554  | 2.754  | 3.006 | 2.875 | 5.061 | 4.444  | 3.794  | 5.401  | 4.343 | 3.658 |
| 300% Mod., Mpa    | 4.277  | 4.682  | 5.057 | 4.782 | 7.445 | 6.558  | 5.632  | 7.924  | 6.485 | 5.552 |
| Stress at Break, Mpa | 10.927 | 10.926 | 11.52 | 9.878 | 11.40 | 10.554 | 10.447 | 11.123 | 10.32 | 10.75 |
| % Strain at Break | 824    | 746    | 731   | 713   | 672   | 696    | 716    | 608    | 617   | 702   |

|                      | Sample ID A | | | | | | | | | |
|----------------------|-----|-----|-----|-----|-----|-----|-----|-----|-----|-----|
|                      | #11 | #12 | #13 | #14 | #15 | #16 | #17 | #18 | #19 | #20 |

ODR 160° C., 60 min, 3° Arc

|          |       |       |       |       |       |       |       |       |       |       |
|----------|-------|-------|-------|-------|-------|-------|-------|-------|-------|-------|
| MH, dNm  | 28.49 | 30.30 | 25.22 | 27.86 | 26.37 | 26.15 | 28.10 | 31.25 | 35.21 | 33.47 |
| ML, dNm  | 9.4   | 9.85  | 8.14  | 8.12  | 7.71  | 7.84  | 8.32  | 8.98  | 9.53  | 9.38  |
| Ts2, min | 4.01  | 4.04  | 5.29  | 4.60  | 4.28  | 4.90  | 4.97  | 4.74  | 4.64  | 4.88  |
| T90, min | 33.85 | 35.29 | 31.60 | 31.28 | 36.25 | 30.05 | 31.20 | 31.35 | 40.6  | 39.64 |

Die C, 50° C.

|                      |      |      |       |      |      |      |      |      |      |      |
|----------------------|------|------|-------|------|------|------|------|------|------|------|
| Peak Load, N         | 77.6 | 67.0 | 105.2 | 91.0 | 90.1 | 57.8 | 67.7 | 50.3 | 59.7 | 70.5 |
| Tear Resistance, N/mm| 38.6 | 35.3 | 40.3  | 38.9 | 36.0 | 31.6 | 32.5 | 24.4 | 28.8 | 28.2 |

Die C, 80° C.

|                      |      |      |      |      |      |      |      |      |      |      |
|----------------------|------|------|------|------|------|------|------|------|------|------|
| Peak Load, N         | 40.8 | 33.8 | 40.6 | 34.7 | 72.5 | 34.8 | 40.8 | 33.0 | 65.1 | 88.6 |
| Tear Resistance, N/mm| 19.8 | 16.8 | 17.0 | 15.2 | 26.5 | 18.3 | 19.5 | 15.4 | 33.6 | 30.7 |

Tensile, Non Aging, Test Temperature: Room Temp

|                   |       |       |       |       |       |       |       |       |       |       |
|-------------------|-------|-------|-------|-------|-------|-------|-------|-------|-------|-------|
| 100% Mod., Mpa    | 2.312 | 2.929 | 2.377 | 2.948 | 1.691 | 1.768 | 2.101 | 2.745 | 1.288 | 1.337 |
| 200% Mod., Mpa    | 4.725 | 6.043 | 4.586 | 5.618 | 3.376 | 3.565 | 4.3   | 5.576 | 2.752 | 2.72  |
| 300% Mod., Mpa    | 7.066 | 8.255 | 6.785 | 7.846 | 5.178 | 5.523 | 6.57  | 7.891 | 4.371 | 4.251 |
| Stress at Break, Mpa | 10.32 | 9.949 | 9.89  | 9.725 | 10.25 | 9.955 | 9.472 | 9.493 | 8.481 | 7.891 |
| % Strain at Break | 613   | 510   | 592   | 533   | 730   | 650   | 567   | 495   | 704   | 675   |

ODR = Monsanto Oscillating Disc Cure Rheometer, described in detail in American Society for testing and materials, Standard ASTM D 2084.

TABLE 7

|                   | Sample ID A | | | | | | | | | |
|-------------------|-------|-------|-------|-------|-------|-------|-------|--------|-------|-------|
|                   | #1    | #2    | #3    | #4    | #5    | #6    | #7    | #8     | #9    | #10   |
| 100% Mod., MPa    | 2.286 | 2.127 | 2.337 | 2.263 | 3.614 | 3.086 | 2.772 | 3.743  | 3.113 | 2.876 |
| 200% Mod., MPa    | 4.781 | 4.518 | 4.98  | 4.808 | 6.663 | 5.577 | 5.018 | 6.963  | 5.615 | 5.114 |
| 300% Mod., MPa    | 6.548 | 6.511 | 6.946 | 6.787 | 8.664 | 7.442 | 6.794 | 8.999  | 7.592 | 6.884 |
| Stress at Break, MPa | 9.458 | 9.737 | 9.732 | 9.236 | 10.29 | 9.705 | 9.194 | 10.381 | 9.45  | 9.347 |
| % Strain at Break | 619   | 603   | 576   | 537   | 549   | 588   | 590   | 497    | 522   | 585   |

|                   | Sample ID A | | | | | | | | | |
|-------------------|-------|-------|-------|-------|-------|-------|-------|-------|-------|-------|
|                   | #11   | #12   | #13   | #14   | #15   | #16   | #17   | #18   | #19   | #20   |
| 100% Mod., MPa    | 3.348 | 4.1   | 3.387 | 4.331 | 2.56  | 2.681 | 3.12  | 4.01  | 2.197 | 2.189 |
| 200% Mod., MPa    | 6.333 | 7.658 | 6.095 | 7.624 | 4.889 | 4.956 | 5.982 | 7.452 | 4.378 | 4.277 |
| 300% Mod., MPa    | 8.294 | 9.404 | 8.018 | 9.11  | 6.541 | 6.766 | 7.947 | 9.088 | 5.991 | 5.828 |
| Stress at Break, MPa | 9.447 | 9.654 | 9.208 | 9.28  | 9.153 | 8.804 | 9.218 | 9.268 | 8.866 | 8.382 |
| % Strain at Break | 448   | 365   | 473   | 362   | 625   | 496   | 470   | 339   | 653   | 620   |

*Tensile, Aging, 48 h @ 120° C.
Test Temperature: Room Temperature
Conducted under ASTM standards

TABLE 8

| | \#1 | \#2 | \#3 | \#4 | \#5 | \#6 | \#7 | \#8 | \#9 | \#10 |
|---|---|---|---|---|---|---|---|---|---|---|
| | | | | | Sample ID A | | | | | |
| | | | | Shore A Hardness | | | | | | |
| Non-Aging | 55.1 | 54.9 | 52.7 | 56.1 | 71.3 | 67.3 | 66.7 | 73.1 | 71.1 | 66.1 |
| Aging | 61.9 | 62.1 | 61.5 | 63.9 | 75.9 | 72.1 | 71.9 | 77.7 | 72.1 | 71.3 |
| Air Permeability @ 30° C., Unit: [(ml @ STP)(mm)]/ [(m²)(760 mm Hg)(hr)] | nm | nm | nm | 2.2 | nm | nm | nm | 1.9 | 2.4 | 2.9 |
| Air Permeability @ 65° C., Unit: [(ml @ STP)(mm)]/ [(m²)(760 mm Hg)(hr)] | nm | nm | nm | 13.6 | nm | nm | nm | 14.0 | 16.6 | 19.5 |

| | \#11 | \#12 | \#13 | \#14 | \#15 | \#16 | \#17 | \#18 | \#19 | \#20 |
|---|---|---|---|---|---|---|---|---|---|---|
| | | | | | Sample ID A | | | | | |
| | | | | Shore A Hardness | | | | | | |
| Non-Aging | 69.1 | 70.5 | 72.9 | 72.7 | 59.9 | 62.9 | 67.3 | 67.7 | 56.1 | 54.3 |
| Aging | 72.3 | 74.9 | 74.1 | 76.7 | 64.9 | 68.3 | 72.1 | 74.3 | 62.3 | 62.5 |
| Air Permeability @ 30° C., Unit: [(ml @ STP)(mm)]/ [(m²)(760 mm Hg)(hr)] | nm | nm | 2.8 | 2.7 | nm | 2.7 | 2.7 | 2.5 | nm | 3.5 |
| Air Permeability @ 65° C., Unit: [(ml @ STP)(mm)]/ [(m²)(760 mm Hg)(hr)] | nm | nm | 18.5 | 18.3 | nm | 18.1 | 17.9 | 17.0 | nm | 20.6 | nm = not measured
760 mm Hg is approximately equivalent to 100 kPa.
STP = standard temperature and pressure Although the invention has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A barrier membrane comprising an isobutylene based polymer and a semi-crystalline polymer wherein the semi-crystalline polymer has a melting point from about 25° C. to about 105° C. and a heat of fusion from about 9 J/g to about 50 J/g as determined by DSC.

2. The barrier membrane as defined in claim 1 wherein the semi-crystalline polymer has a heat of fusion from about 11 J/g to about 38 J/g as determined by DSC.

3. The barrier membrane as defined in claim 1 wherein the semi-crystalline polymer comprises a heat of fusion from about 15 J/g to about 28 J/g as determined by DSC.

4. The barrier membrane as defined in claim 1 comprising from about 3 to about 95 weight percent semi-crystalline polymer.

5. The barrier membrane as defined in claim 1 comprising from about 5 to about 30 weight percent semi-crystalline polymer.

6. The barrier membrane as defined in claim 1 wherein the semi-crystalline polymer comprises a random copolymer.

7. The barrier membrane as defined in claim 1 wherein the isobutylene based polymer is selected from the group consisting of butyl rubber, random copolymers of a $C_4$ to $C_7$ isomonoolefin and a para-alkylstyrene and blends thereof.

8. The barrier membrane as defined in claim 7 wherein the isobutylene based polymer is halogenated.

9. The barrier membrane as defined in claim 8 wherein the halogenated isobutylene based polymer is brominated butyl rubber.

10. The barrier membrane as defined in claim 1 having an air permeability from less than about 3.5 [(ml@ STP)(mm)]/ [(m²)(760 mm Hg)(hr)] at about 30° C.

11. The barrier membrane as defined in claim 1 having an air permeability from less than about 2.2 [(ml@ STP)(mm)]/ [(m²)(760 mm Hg)(hr)] at about 30° C.

12. The barrier membrane as defined in claim 1 having a green strength from about 0.1 MPa to about 1 MPa at 100% modulus at about 50° C.

13. The barrier membrane as defined in claim 1 further comprising one or more of the following compounds: amorphous polymer, plasticizer oil, oil, isobutylene oil, antioxidants, stabilizers, fillers, pigments, and carbon black.

14. The barrier membrane as defined in claim 1 wherein the semi-crystalline polymer is produced from:
   a.) propylene monomers;
   b.) one or more other monomers selected from the group consisting of ethylene, alpha-olefins having 4 to 8 carbon atoms, and styrenes, and;
   c.) optionally, one or more dienes.

15. A tire innerliner comprising the barrier membrane defined in claim 1.

16. A tire innertube comprising the barrier membrane defined in claim 1.

17. A blend comprising an isobutylene based polymer and a semi-crystalline propylene polymer having a propylene content of at least about 75 weight percent.

18. The blend as defined in claim 17 wherein the semi-crystalline propylene polymer has a melting point of from about 25° C. to about 105° C. and a heat of fusion from about 9 J/g to about 50 J/g as determined by DSC.

19. The blend as defined in claim 17 wherein the semi-crystalline propylene polymer comprises a heat of fusion from about 11 J/g to about 38 J/g as determined by DSC.

20. The blend as defined in claim 17 wherein the semi-crystalline propylene polymer comprises a heat of fusion from about 15 J/g to about 28 J/g as determined by DSC.

21. The blend as defined in claim 17 wherein the semi-crystalline polymer further comprises one or more dienes.

22. The blend as defined in claim 21 wherein at least one of the one or more dienes is a non-conjugated diene.

23. The blend as defined in claim 22 wherein the non-conjugated diene is selected from the group comprising of ethylidene norbornene, vinyl norbornene, dicyclopentadiene and 1,4-heaxdiene.

24. The blend as defined in claim 17 wherein the isobutylene based polymer is selected from the group consisting of butyl rubber, polyisobutylene, random copolymers of a $C_4$ to $C_7$ isomonoolefin and a para-alkylstyrene and blends thereof.

25. The blend as defined in claim 20 wherein the isobutylene based polymer is halogenated.

26. The blend as defined in claim 25 wherein the isobutylene based polymer is brominated butyl rubber.

27. The blend as defined in claim 17 wherein the isobutylene based polymer is a halogen-containing random copolymer of a $C_4$ to $C_7$ isomonoolefin and a para-alkylstyrene.

28. The blend as defined in claim 17 wherein the semi crystalline polymer comprises a random copolymer.

29. The blend as defined in claim 17 comprising an air permeability from less than about 3.5 [(ml@ STP)(mm)]/[($m^2$)(760 mm Hg)(hr)] at about 30° C.

30. The blend as defined in claim 17 comprising an air permeability from less than about 2.2 [(ml@ STP)(mm)]/[($m^2$)(760 mm Hg)(hr)] at about 30° C.

31. The blend as defined in claim 17 comprising a green strength from about 0.1 MPa to about 1 MPa at 100% modulus at about 50° C.

32. The blend as defined in claim 17 further comprising one or more of the following compounds: amorphous polymer, oil, isobutylene oil, antioxidants, stabilizers, fillers, pigments, and carbon black.

33. The blend as defined in claim 17 wherein the blend is curable.

34. The blend as defined in claim 17 wherein the blend is a vulcanizate.

35. The blend as defined in claim 20 wherein the semi crystalline polymer is a random copolymer produced from:
   a.) propylene monomers;
   b.) one or more other monomers selected from the group consisting of ethylene, alpha-olefins having 4 to 8 carbon atoms, styrenes, and;
   c.) optionally, one or more dienes.

36. An article of manufacture comprising the blend as defined in claim 17.

37. A method for producing a polymer blend comprising mixing an isobutylene based polymer with a semi crystalline polymer having a propylene content of at least about 75 weight percent.

38. The method as defined in claim 33 further comprising adding one or more of the following compounds: amorphous polymer, oil, isobutylene oil, antioxidants, stabilizers, fillers, pigments, and carbon black.

* * * * *